(12) United States Patent
Demolliens et al.

(10) Patent No.: US 12,187,611 B2
(45) Date of Patent: Jan. 7, 2025

(54) PROCESS AND APPARATUS FOR THE SEPARATION OF A MIXTURE OF HYDROGEN AND CARBON MONOXIDE AT LOW TEMPERATURE

(71) Applicant: L'Air Liquide Société Anonyme pour l'Etude et l'Exploitation des Procédés Georges Claude, Paris (FR)

(72) Inventors: Bertrand Demolliens, Paris (FR); Antoine Hernandez, Saint Maur des Fossés (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 421 days.

(21) Appl. No.: 17/736,539

(22) Filed: May 4, 2022

(65) Prior Publication Data

US 2022/0356060 A1    Nov. 10, 2022

(30) Foreign Application Priority Data

May 4, 2021    (FR) ...................................... 2104698

(51) Int. Cl.
*F25J 3/08*    (2006.01)
*B01D 53/00*    (2006.01)
(Continued)

(52) U.S. Cl.
CPC ............ *C01B 3/506* (2013.01); *B01D 53/002* (2013.01); *B01D 53/047* (2013.01); *C01B 3/56* (2013.01);
(Continued)

(58) Field of Classification Search
CPC . B01D 53/00; B01D 53/047; F25J 3/06; F25J 3/0295; F25J 3/08
See application file for complete search history.

(56) References Cited

U.S. PATENT DOCUMENTS

| 3,691,779 A | 9/1972 | Meisler et al. |
|---|---|---|
| 2017/0081186 A1 | 3/2017 | Chambron et al. |
| 2018/0058757 A1* | 3/2018 | Shah ....................... C01B 3/506 |

FOREIGN PATENT DOCUMENTS

| DE | 42 10 638 | 3/1993 |
|---|---|---|
| FR | 2 872 890 | 1/2006 |
| FR | 3 021 044 | 11/2015 |

OTHER PUBLICATIONS

French Search Report for corresponding FR 2104698, Dec. 9, 2021.

* cited by examiner

*Primary Examiner* — Sharon Pregler
(74) *Attorney, Agent, or Firm* — Elwood L. Haynes

(57) ABSTRACT

In a process for the separation of a mixture containing hydrogen and carbon monoxide to produce gaseous hydrogen, the mixture is cooled down to a temperature below −180° C. and then separated at a temperature below −100° C. to produce a gas enriched in hydrogen and a fluid enriched in carbon monoxide, at least a part of the gas enriched in hydrogen is sent to a pressure swing adsorption separation apparatus operating at a temperature above 0° C. to produce a gas rich in hydrogen at a pressure of at least 20 bars, and at least a part of the gas rich in hydrogen is cooled in the heat exchanger down to a temperature below −100° C., reduced in pressure in a turbine down to a pressure of at least 8 bars and reheated in the heat exchanger to constitute a product rich in hydrogen at a pressure of at least 8 bars.

12 Claims, 2 Drawing Sheets

(51) Int. Cl.
*B01D 53/047* (2006.01)
*C01B 3/50* (2006.01)
*C01B 3/56* (2006.01)
*C01B 32/40* (2017.01)
*F25J 3/06* (2006.01)

(52) U.S. Cl.
CPC ............. *C01B 32/40* (2017.08); *F25J 3/0675* (2013.01); *B01D 2256/16* (2013.01); *B01D 2257/502* (2013.01); *B01D 2257/504* (2013.01); *B01D 2257/80* (2013.01); *C01B 2203/042* (2013.01); *C01B 2203/046* (2013.01); *C01B 2203/047* (2013.01)

PROCESS AND APPARATUS FOR THE SEPARATION OF A MIXTURE OF HYDROGEN AND CARBON MONOXIDE AT LOW TEMPERATURE

CROSS REFERENCE TO RELATED APPLICATIONS

This application claims the benefit of priority under 35 U.S.C. § 119 (a) and (b) to French Patent Application No. 2104698, filed May 4, 2021, the entire contents of which are incorporated herein by reference.

BACKGROUND

The present invention relates to a process and to an apparatus for the separation of a mixture of hydrogen and carbon monoxide at low temperature. It relates in particular to the separation by distillation and/or scrubbing and/or partial condensation at temperatures below −100° C.

The mixture to be separated preferably contains at least 10 mol % of hydrogen, indeed even at least 30 mol % of hydrogen.

The mixture can be a synthesis gas and can contain, in addition to hydrogen and carbon monoxide, at least one of the following components: carbon dioxide, nitrogen, methane or water.

It can contain, as additional impurities, at least one of the following components: a sulfide, a cyanide, ammonia or at least one hydrocarbon heavier than methane.

The partial condensation processes and the scrubbing processes are particularly effective at high pressures; thus, if the mixture to be separated is at high pressure, it is advantageous to carry out the separation by partial condensation or by scrubbing at the high pressure, without reducing the mixture in pressure. This makes it possible to produce hydrogen at a pressure slightly below that of the mixture.

For example, in the case of pulverized coal gasifiers, a mixture of hydrogen and carbon monoxide at 60 bars is produced, making possible the production of hydrogen by partial condensation and/or scrubbing at approximately 56 bars.

It is known, from DE4210638 and FR 3 021 044, to separate the hydrogen produced at low temperature by adsorption in a pressure swing adsorption apparatus PSA.

Let the case be considered where the hydrogen is required at 28 bars for a pipeline and 8 bars for a client. In this case, the hydrogen will be produced at the highest pressure in order to avoid the use of two PSA apparatuses.

The pressure swing adsorption apparatus PSA preferably operates at approximately 30 bars for two reasons:

The pressure of 30 bars represents an optimum for this technology: with a higher pressure, the hydrogen yield would reduce whereas, with a lower pressure, the pressure of the product would not be reached.

The valves of a PSA have to operate at a pressure of approximately 35 bars for the valves to remain in the range of 300 psi maximum, a higher pressure requiring more expensive valves.

A pressure swing adsorption apparatus (PSA) operates according to a process for the separation of gas mixtures during which the adsorption of a gas by a solid or a liquid at a given pressure, followed by its desorption at a lower pressure, take place alternatively.

It consists in withdrawing a gas from a gas mixture, by using its chemical affinity and its specific characteristics with regard to a solid material, the adsorbent being exposed to a rigorously controlled oscillation in pressure. A selective adsorption takes place by virtue of different equilibrium capacities (equilibrium adsorbent) or by differences in the adsorption rates (kinetic adsorbent).

If the hydrogen is produced at 56 bars, this requires reducing the hydrogen in pressure downstream of the adsorption in addition to reducing the required product in pressure to 8 bars.

SUMMARY

The aim of the present invention is to integrate the pressure swing adsorption apparatus with the low-temperature separation apparatus in order to use the reduction in pressure of hydrogen to provide cold to the low-temperature separation.

U.S. Pat. No. 3,691,779 describes the integration of an apparatus for separation by partial condensation and an adsorption apparatus operating at between −195° C. and −162° C. A part of the hydrogen produced by the adsorption is used to produce cold for the separation apparatus by reduction in pressure in a turbine down to 2.4 bars and is subsequently used to regenerate the adsorption apparatus.

According to a subject-matter of the invention, there is provided a process for the separation of a mixture containing hydrogen and carbon monoxide to produce gaseous hydrogen, in which:

i) the mixture is cooled in a heat exchanger down to a temperature below −180° C. and then separated at a temperature below −100° C. by at least one stage of partial condensation and/or distillation and/or scrubbing in order to produce a gas enriched in hydrogen and a fluid enriched in carbon monoxide, ii) at least a part of the gas enriched in hydrogen is sent to a pressure swing adsorption separation apparatus operating at a temperature above 0° C. in order to produce a gas rich in hydrogen at a pressure of at least 20 bars and iii) at least a part of the gas rich in hydrogen is cooled in the heat exchanger down to a temperature below −100° C., reduced in pressure in a turbine down to a pressure of at least 8 bars and reheated in the heat exchanger in order to constitute a product rich in hydrogen at a pressure of at least 8 bars.

According to other optional aspects:

the at least a part of the gas enriched in hydrogen is reheated in the heat exchanger upstream of the adsorption separation apparatus, the gas enriched in hydrogen of stage ii) is at a pressure of at least 51 bars, the gas rich in hydrogen is produced by the adsorption separation apparatus at a pressure of at least 50 bars and it is reduced in pressure by the turbine down to a pressure of at least 20 bars, the gas rich in hydrogen reduced in pressure down to a pressure of at least 20 bars is divided into two and only one part of the gas is reduced in pressure downstream of its reheating in the exchanger down to a pressure of at most 12 bars, the gas enriched in hydrogen of stage ii) is at between 28 and 32 bars, the gas rich in hydrogen is produced by the adsorption separation apparatus at between 27 and 31 bars and it is reduced in pressure at least in part down to a pressure of at most 12 bars by the turbine, the gas reduced in pressure down to a pressure of at most 12 bars constitutes the product rich in hydrogen of the process, the mixture cooled in the heat exchanger is at a pressure of at least 50 bars, the mixture is separated in a first partial condensation stage, the gas from the first partial condensation stage is cooled and is sent to a second partial condensation stage and the gas rich in hydrogen reduced in pressure in the turbine is reheated by heat exchange with the gas from the first partial condensation stage which is cooled, the temperature at the inlet of the second partial condensation is less than −200° C., indeed even than −203° C., a flow enriched in hydrogen from an exterior source is also separated in the pressure swing adsorption separation apparatus, optionally so that the flow reduced in pressure in the turbine is greater than the flow of gas enriched in hydrogen separated at the temperature below −100° C.

the temperature of the gas at the turbine outlet is less than −200° C., indeed even than −203° C.

According to a subject-matter of the invention, there is provided an apparatus for the separation of a mixture containing hydrogen and carbon monoxide in order to produce gaseous hydrogen, comprising a separation unit, where at least one stage of partial condensation and/or distillation and/or scrubbing is carried out, a heat exchanger, a pressure swing adsorption separation apparatus (PSA), a turbine, means for sending the mixture to be cooled in the heat exchanger down to a temperature below −180° C., means for sending the cooled mixture to be separated at a temperature below −100° C. by at least one stage of partial condensation and/or by distillation and/or by scrubbing in the separation unit in order to produce a gas enriched in hydrogen and a fluid enriched in carbon monoxide, means for sending at least a part of the gas enriched in hydrogen to the pressure swing adsorption separation apparatus operating at a temperature above 0° C. in order to produce a gas rich in hydrogen at a pressure of at least 20 bars, means for sending at least a part of the gas rich in hydrogen to be cooled in the heat exchanger down to a temperature below −100° C., subsequently to be reduced in pressure in the turbine down to a pressure of at least 8 bars and means for sending the pressure-reduced gas to be reheated in the heat exchanger in order to constitute a product rich in hydrogen at a pressure of at least 8 bars.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
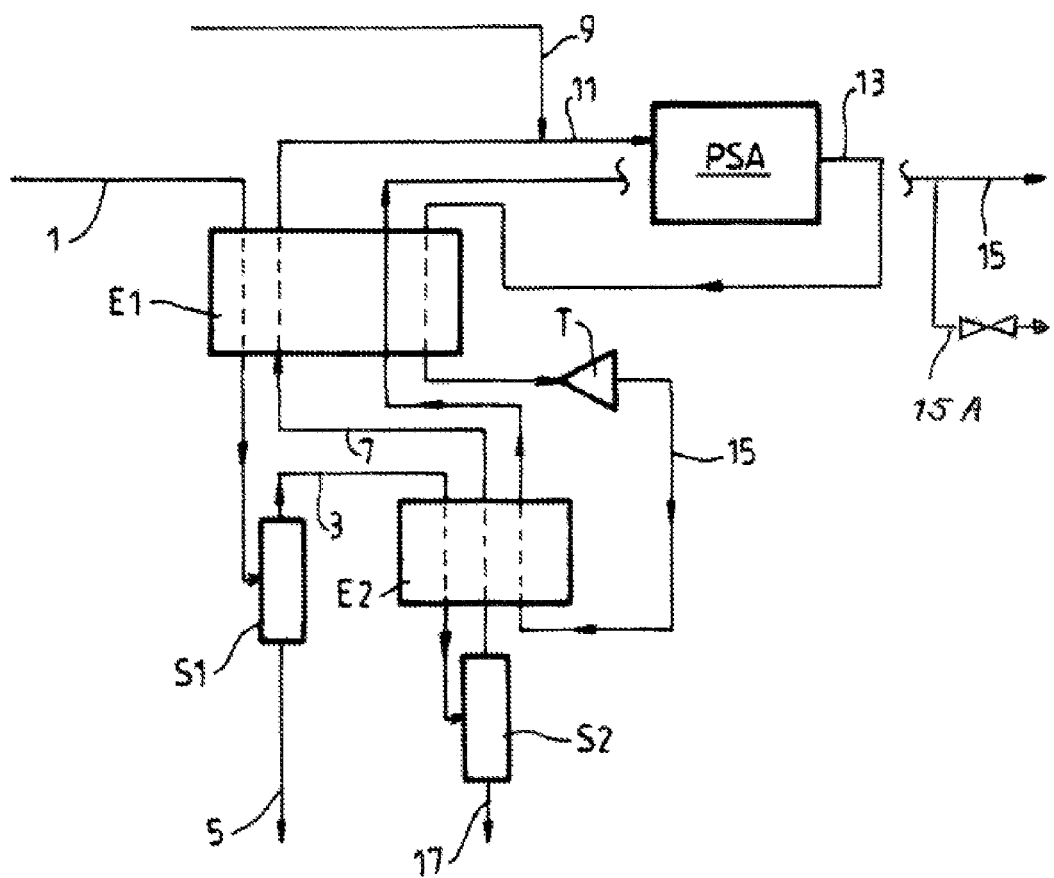
FIG. 1 represents a process according to one embodiment of the present invention.

FIG. 1 represents a process in which the pressure swing adsorption apparatus PSA receives a flow rich in hydrogen 11 at approximately 55 bars. The hydrogen 13 purified by adsorption is at approximately 54 bars and can be reduced in pressure to provide cold to the low-temperature separation process. This hydrogen is sent back to the insulated chamber from where it originates and is reduced in pressure there in order to contribute to the production of cold and to reduce the energy consumption. Given that the gas is very pure in hydrogen, it can be reduced in pressure down to a very low temperature, for example −204° C. This makes it possible to carry out the separation of hydrogen in the chamber at a lower temperature and to improve the yield of carbon monoxide and, if appropriate, of methane.

The chamber contains heat exchangers E1, E2 and phase separators S1, S2.

The flow of synthesis gas 1 at 56 bars contains carbon monoxide and hydrogen, preferably at least 10 mol % of hydrogen, indeed even at least 30 mol % of hydrogen.

The mixture 1 can contain, in addition to hydrogen and carbon monoxide, at least one of the following components: carbon dioxide, nitrogen, methane or water.

It can contain, as additional impurities, at least one of the following components: a sulfide, a cyanide, ammonia or at least one hydrocarbon heavier than methane.

The water and the carbon dioxide will have to be removed before the low-temperature treatment.

The flow 1 is cooled in the heat exchanger E1 and is partially condensed therein before being sent to a phase separator S1 at −180° C. The liquid produced 5 can be sent to a low-temperature treatment, for example a treatment by distillation and/or scrubbing and/or partial condensation at a temperature below −100° C. The cryogenic treatment can comprise, inter alia, a methane scrubbing, a carbon monoxide scrubbing or a distillation in order to separate the carbon monoxide and the methane, if the flow 1 contains it/them.

The gas 3 from the separator S1 is cooled in an exchanger E2, in order to partially condense it at a lower temperature, and is sent to a phase separator S2. The liquid produced 17 can be sent to a low-temperature treatment, for example a treatment by distillation and/or scrubbing and/or partial condensation at a temperature below −100° C. The cryogenic treatment can comprise, inter alia, a methane scrubbing, a carbon monoxide scrubbing or a distillation in order to separate the carbon monoxide and the methane, if the flow 1 contains it/them.

The gas 7 from the separator S2, enriched in hydrogen, is reheated in the exchangers E2, E1 and is optionally mixed, at a temperature below 0° C., with a flow 9 of gas enriched in hydrogen originating from a shift unit.

The gas 7 at 55 bars feeds a pressure swing adsorption separation unit, where it is separated to form a gas rich in hydrogen 13 at 54 bars. This gas 13 is returned to the chamber which contains the exchangers E1, E2 and the separators S1, S2 without having to be purified of carbon dioxide and of water.

The gas 13 is cooled in the heat exchanger E1 and is then reduced in pressure in a turbine T down to a temperature of −204° C. in order to produce cold. The pressure-reduced flow 15 at 29 bars is reheated in the exchangers E2, E1 and is subsequently used as product. A part 15A of the product can be reduced in pressure down to at most 12 bars, for example at most 8 bars, in a valve in order to form a low-pressure product.

If there is a contribution 9 of hydrogen from another source, the flow 13, 15 can be greater than the flow 7. If the contribution 9 contains water and/or carbon dioxide, these will have to be removed from the flow 13 upstream of the low-temperature cooling.

The reduction in pressure in the turbine T constitutes the only contribution of cold for the low-temperature separation process, apart from the Joule-Thomson reduction in pressure in valves.

Figure 2:
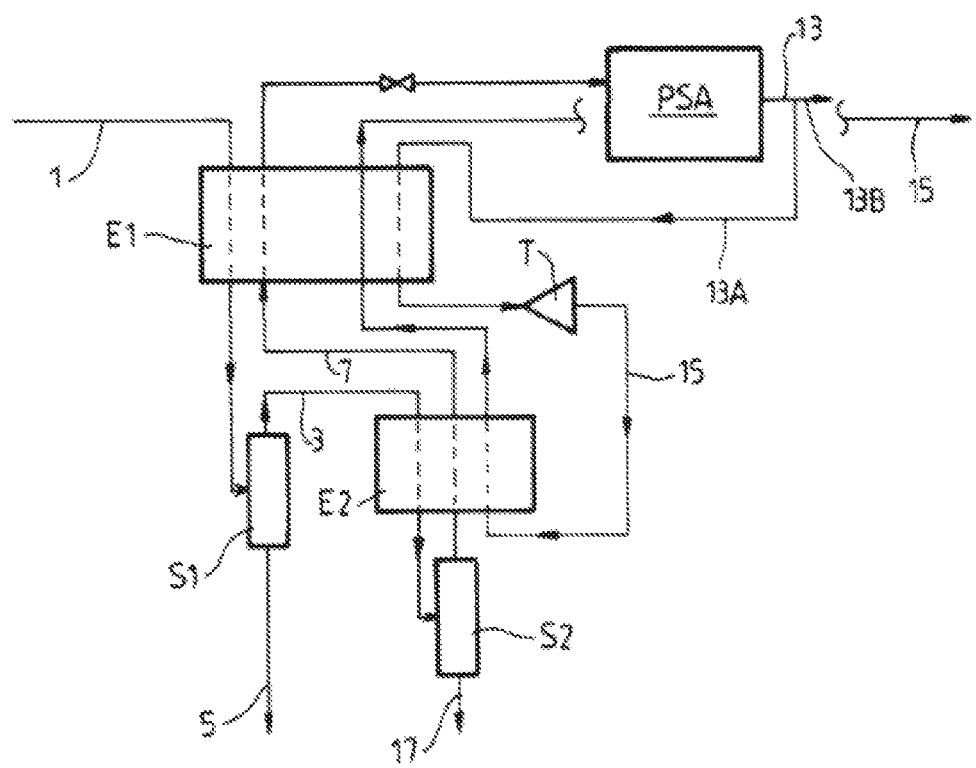
FIG. 2 represents a process according to another embodiment of the present invention.

FIG. 2 represents a process in which the pressure swing adsorption apparatus PSA receives a flow 11 at lower pressure than that of FIG. 1 because the flow 7 has been reduced in pressure down to between 28 and 32 bars, in this instance 29 bars, upstream of the adsorption apparatus, in order to make it possible for the latter to operate at a pressure close to its optimum pressure. The adsorption apparatus produces a gas rich in hydrogen at between 27 and 31 bars, in this instance 28 bars. A part 13B of the product at 28 bars is sent directly to the customer and the remainder 13A is cooled in the heat exchanger E1 and is then reduced in pressure from 28 bars to 8 bars in a turbine T down to a temperature of −204° C. in order to produce cold. The pressure-reduced flow 15 at 8 bars is reheated in the exchangers E2, E1 and is subsequently used as product.

Thus, the process produces two flows of hydrogen at two pressures, one being the optimum pressure for the adsorption and the other being a lower pressure than the optimum pressure. The difference between the two pressures corresponds to the reduction in pressure in the turbine T.

The remainder of the process corresponds to that described for FIG. 1 treating a synthesis gas 1 at 56 bars.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the separation of a mixture containing hydrogen and carbon monoxide to produce gaseous hydrogen, comprising:
   i) cooling the mixture in a heat exchanger down to a temperature below −180° C. and then separating the cooled mixture at a temperature below −100° C. by at least one stage of partial condensation and/or distillation and/or scrubbing in order to produce a gas enriched in hydrogen and a fluid enriched in carbon monoxide,
   ii) sending at least a part of the gas enriched in hydrogen to a pressure swing adsorption separation apparatus operating at a temperature above 0° C. in order to produce a gas rich in hydrogen at a pressure of at least 20 bars and
   iii) cooling at least a part of the gas rich in hydrogen in the heat exchanger down to a temperature below −100° C., reducing the pressure of the cooled gas rich in hydrogen in a turbine down to a pressure of at least 8 bars and reheating the reduce pressure gas the heat exchanger in order to constitute a product rich in hydrogen at a pressure of at least 8 bars.

2. The process according to claim 1, wherein at least a part of the gas enriched in hydrogen is reheated in the heat exchanger upstream of the adsorption separation apparatus.

3. The process according to claim 1, wherein the gas enriched in hydrogen of stage ii) is at a pressure of at least 51 bars, the gas rich in hydrogen is produced by the adsorption separation apparatus at a pressure of at least 50 bars and then reduced in pressure by the turbine down to a pressure of at least 20 bars.

4. The process according to claim 3, in which the gas rich in hydrogen reduced in pressure down to a pressure of at least 20 bars is divided into two parts, and wherein only one part of the gas is reduced in pressure downstream of the reheating in the exchanger down to a pressure of at most 12 bars.

5. The process according to claim 1, wherein the gas enriched in hydrogen of stage ii) is at between 28 and 32 bars, the gas rich in hydrogen is produced by the adsorption separation apparatus at between 27 and 31 bars and is reduced in pressure at least in part down to a pressure of at most 12 bars by the turbine.

6. The process according to claim 5, wherein the gas reduced in pressure down to a pressure of at most 12 bars constitutes the product rich in hydrogen of the process.

7. The process according to claim 1, wherein the mixture cooled in the heat exchanger is at a pressure of at least 50 bars.

8. The process according to claim 1, wherein the mixture is separated in a first partial condensation stage, the gas from the first partial condensation stage is cooled and is sent to a second partial condensation stage and the gas rich in hydrogen reduced in pressure in the turbine is reheated by heat exchange with the gas from the first partial condensation stage which is cooled.

9. The process according to claim 8, wherein the temperature at the inlet of the second partial condensation is less than −200° C.

10. The process according to claim 1, wherein a flow enriched in hydrogen from an exterior source is also separated in the pressure swing adsorption separation apparatus.

11. The process according to claim 1, wherein the temperature of the gas at the turbine outlet is less than −200° C.

12. An apparatus for the separation of a mixture containing hydrogen and carbon monoxide in order to produce gaseous hydrogen, comprising a separation unit, where at least one stage of partial condensation and/or distillation and/or scrubbing is carried out, a heat exchanger, a pressure swing adsorption separation apparatus, a turbine, a means for sending the mixture to be cooled in the heat exchanger down to a temperature below −180° C., a means for sending the cooled mixture to be separated at a temperature below −100° C. by at least one stage of partial condensation and/or by distillation and/or by scrubbing in the separation unit in order to produce a gas enriched in hydrogen and a fluid enriched in carbon monoxide, a means for sending at least a part of the gas enriched in hydrogen to the pressure swing adsorption separation apparatus operating at a temperature above 0° C. in order to produce a gas rich in hydrogen at a pressure of at least 20 bars, a means for sending at least a part of the gas rich in hydrogen to be cooled in the heat exchanger down to a temperature below −100° C., subsequently to be reduced in pressure in the turbine down to a pressure of at least 8 bars and a means for sending the pressure-reduced gas to be reheated in the heat exchanger in order to constitute a product rich in hydrogen at a pressure of at least 8 bars.

* * * * *